US012776192B2

(12) United States Patent
Morin et al.

(10) Patent No.: US 12,776,192 B2
(45) **Date of Patent: *Oct. 27, 2026**

(54) LOTTERY TICKET HAVING CONNECTED SYMBOL SET FEATURE

(71) Applicant: Brightstar Global Solutions Corporation, Providence, RI (US)

(72) Inventors: Amy Morin, North Kingston, RI (US); Patricia Schmidt, Bradenton, FL (US); Derek Levesque, Cranston, RI (US); Xianfeng Shang, Jersey City, NJ (US); Sandra Carpenter, Schenectady, NY (US)

(73) Assignee: Brightstar Global Solutions Corporation, Providence, RI (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/828,370

(22) Filed: Sep. 9, 2024

(65) Prior Publication Data

US 2025/0006015 A1 Jan. 2, 2025

Related U.S. Application Data

(63) Continuation of application No. 17/658,458, filed on Apr. 8, 2022, now Pat. No. 12,112,602.

(51) Int. Cl.
*G07F 17/32* (2006.01)

(52) U.S. Cl.
CPC ........ *G07F 17/329* (2013.01); *G07F 17/3211* (2013.01)

(58) Field of Classification Search
CPC ..... G07F 17/329; G07F 17/3211; G07F 17/34
USPC .......................................................... 463/17
See application file for complete search history.

(56) References Cited

U.S. PATENT DOCUMENTS

| | | | |
|---|---|---|---|
| 5,566,942 A | 10/1996 | Elum | |
| 5,855,514 A | 1/1999 | Kamille | |
| 6,460,854 B1 | 10/2002 | Mccarey | |
| 7,300,348 B2 | 11/2007 | Kaminkow et al. | |
| 7,604,539 B2 | 10/2009 | Hartl et al. | |
| 7,867,080 B2 | 1/2011 | Nicely et al. | |
| 8,002,625 B2 | 8/2011 | Maya | |
| 8,042,809 B2 | 10/2011 | Walker et al. | |
| 8,287,364 B2 | 10/2012 | Caputo et al. | |
| 8,460,081 B2 | 6/2013 | Meyer | |
| 8,562,419 B2 | 10/2013 | Nicely | |
| 9,262,894 B2 | 2/2016 | Marks et al. | |
| 9,613,337 B1 * | 4/2017 | Garrison | G07F 11/007 |
| 9,728,048 B2 | 8/2017 | Saunders | |

(Continued)

OTHER PUBLICATIONS

"Cash Crossword", https://nelottery.com/homeapp/scratch/1163/0/gamedetail/web; available prior to Sep. 20, 2021.

(Continued)

*Primary Examiner* — Michael A Cuff
(74) *Attorney, Agent, or Firm* — Neal, Gerber & Eisenberg LLP

(57) ABSTRACT

Lottery tickets and lottery gaming systems and methods providing such lottery tickets, wherein the lottery tickets each have a connected symbol set feature including a plurality of connected symbol sets, a plurality of player symbols, and potential awards that can be won based on the connected symbol sets and the player symbols.

20 Claims, 4 Drawing Sheets

(56) References Cited

U.S. PATENT DOCUMENTS

| | | | |
|---|---|---|---|
| 9,984,534 | B2 | 5/2018 | Trainor |
| 10,173,126 | B2 | 1/2019 | Brouillard et al. |
| 2004/0195765 | A1 | 10/2004 | Bellefleur |
| 2010/0045026 | A1 | 2/2010 | Napolitano et al. |
| 2011/0042896 | A1 | 2/2011 | Napolitano et al. |
| 2014/0011569 | A1 | 1/2014 | Saunders et al. |
| 2014/0087829 | A1 | 3/2014 | Watkins et al. |
| 2015/0379804 | A1 | 12/2015 | Casey |
| 2016/0307405 | A1 | 10/2016 | Koll et al. |
| 2018/0165912 | A1 | 6/2018 | Vengrofski |
| 2018/0169513 | A1 | 6/2018 | Brouillard et al. |
| 2020/0211318 | A1 | 7/2020 | Angelopoulos et al. |
| 2020/0398150 | A1 | 12/2020 | Kennedy |
| 2021/0077898 | A1 | 3/2021 | Jackson |
| 2021/0319649 | A1 | 10/2021 | Danielson et al. |
| 2023/0063399 | A1 | 3/2023 | Martineck et al. |
| 2023/0098240 | A1* | 3/2023 | Mariscal ............. G07F 17/3269 463/25 |

OTHER PUBLICATIONS

"Cube Cashword", available prior to Sep. 20, 2021.

"Cube Crossword", available at: https://m.nelottery.com/homeapp/static/shared/images/scratch/ticket_art/1172_art.jpg; available prior to Sep. 20, 2021.

"Lights, Camera, Crossword!", Wisconsin Lottery, located at https://www.wilottery.com/games/instant-games/lights-camera-crossword-2372, Jul. 23, 2021.

"One Word Crossword", https://wvlottery.com/instant-games/one-word-crossword/; available prior to Sep. 20, 2021.

* cited by examiner

LOTTERY TICKET HAVING CONNECTED SYMBOL SET FEATURE

PRIORITY

This application is a continuation of, claims priority to and the benefit of U.S. patent application Ser. No. 17/658,458, filed on Apr. 8, 2022, the entire contents of which is incorporated herein by reference.

BACKGROUND

The present disclosure relates to a lottery ticket having a connected symbol set feature, and to lottery gaming systems and methods for providing such lottery tickets.

Instant lottery tickets are widely available. Instant lottery tickets may include predetermined win or lose indicia information under one or more coverings such as a scratch-off-coating ("SOC"). The coverings are used to ensure that the lottery ticket has not been previously played. Millions of different types of instant lottery tickets are produced and sold every year.

BRIEF SUMMARY

In various embodiments, the present disclosure provides a lottery ticket including a base and multiple symbol sets on the base, wherein a plurality of the symbol sets are different, wherein each of the symbol sets include a plurality of symbols including one of a shared symbol and an un-shared symbol, and wherein a plurality pairs of the symbol sets are connected by the shared symbol of that pair of symbol sets. The lottery ticket further includes multiple player symbols on the base, a removable covering on the base and covering the player symbols, and a paytable on the base. The paytable indicates a first award associated with a first quantity of the symbol sets that are completed based on the player symbols. The paytable also indicates a second award associated with a second quantity of the connected symbol sets that are completed based on the player symbols.

In various other embodiments, the present disclosure provides a lottery ticket including a base and multiple symbol sets on the base, wherein each of the symbol sets are different, wherein each of the symbol set includes a plurality of symbols including at least one shared symbol and at least one un-shared symbol, wherein a plurality of the symbol set include two shared symbols, and wherein each adjacent pair of the symbol sets are connected by the shared symbol of that adjacent pair of symbol sets. The lottery ticket further includes multiple player symbols on the base, a removable covering on the base covering the player symbols, and a paytable on the base. The paytable indicates a first award associated with a first quantity of the symbol sets that are completed based on the player symbols. The paytable also indicates a second award associated with a second quantity of the connected symbol sets that are completed based on the player symbols.

In various other embodiments, the present disclosure provides a lottery gaming system including a processor and a memory device that stores a plurality of instructions, that when executed by the processor, cause the processor to cause a lottery ticket to be created. The lottery ticket includes a base and multiple symbol sets on the base, wherein a plurality of the symbol sets are different, wherein each of the symbol sets include a plurality of symbols including a shared symbol and an un-shared symbol, and wherein a plurality pairs of the symbol sets are each connected by the shared symbol of that pair of symbol sets. The lottery ticket further includes multiple player symbols on the base, a removable covering on the base covering the player symbols, and a paytable on the base. The paytable indicates a first award associated with a first quantity of the symbol sets that are completed based on the player symbols. The paytable also indicates a second award associated with a second quantity of the connected symbol sets that are completed based on the player symbols.

Additional features are described in, and will be apparent from, the following Detailed Description and the figures.

DETAILED DESCRIPTION

Figure 1:
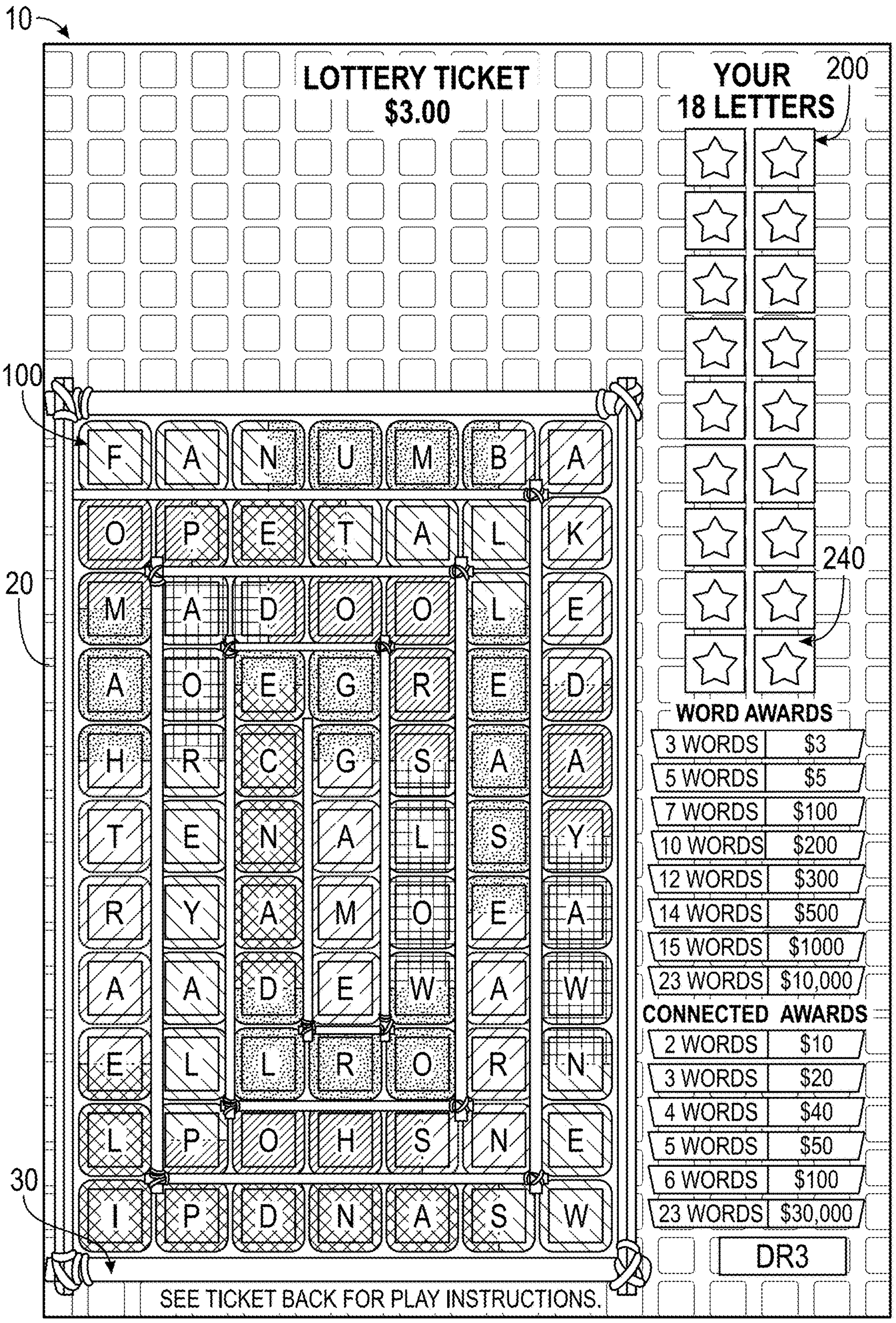
FIGS. 1 and 2 are front views of an example lottery ticket of one embodiment of the present disclosure that includes a connected symbol set feature, and showing the lottery ticket with the SOC in place covering the player symbols and with the SOC removed from covering the player symbols.

In various embodiments, the present disclosure relates generally to lottery tickets having a connected symbol set feature, and lottery gaming systems and methods of operating a lottery gaming system that provide and process such lottery tickets. In various embodiments of the present disclosure, each of a plurality of different lottery tickets for a lottery game that is created and provided by the lottery gaming system includes: a base (such as a paper substrate); a board on the base; a plurality of different symbol sets including two or more connected symbol sets on the board; a plurality of player symbols on the board; and a paytable on the base that shows the potential awards that can be won based on the symbol sets and the player symbols. Each lottery ticket has or is associated with: (1) zero, one, or a plurality of first awards associated with the symbol sets on the board and/or base (and thus that lottery ticket); and (2) zero, one, or a plurality of second awards associated with the connected symbol sets on the board and/or base (and thus that lottery ticket). In various embodiments, the first awards (if any) for each lottery ticket are based on the quantity of symbol sets completed based on the player symbols of that lottery ticket, and the second awards (if any) for each lottery ticket are based on the quantity of completed symbol sets that are connected to another completed symbol set of that lottery ticket.

In various embodiments, the symbol sets are words and the symbols are letters. In various such embodiments, each lottery ticket provided by the lottery gaming system includes: a base; a board (such as a crossword type board) on the base and having: a plurality of connected words on the board; a plurality of player letters on the base; zero, one, or a plurality of first awards associated with the words on the board and/or base (and thus that lottery ticket); and zero, one, or a plurality of second awards associated with the connected words on the board and/or base (and thus that lottery ticket). In various such embodiments, the first awards (if any) for each lottery ticket are based on the quantity of words completed based on the player letters on that lottery ticket, and the second awards (if any) for each lottery ticket are based on the quantity of completed words that are connected to another completed word for that lottery ticket.

In various embodiments, for each lottery ticket, the board of the lottery ticket includes a plurality of rows, a plurality of columns, and a plurality of spaces formed by the rows and columns. In various embodiments, the symbols (such as the letters) and thus the symbol sets (such as the words) are respectively positioned in the spaces. It should be appreciated that the board can be alternatively shaped, sized, and otherwise configured in accordance with the present disclosure. In various embodiments, in addition to a non-see through SOC covering the player symbols on the base, the symbols on the board can be also be covered with a see-through SOC that enables a player to see the symbols on the board under the see-through SOC and to remove such SOC for each of the symbols on the board that matches one of the player symbols on the base to enable the player to keep track of or visually see the symbol sets (such as the words) that are uncompleted, partially completed, and fully completed on the board based on the revealed player symbols as those player symbols are revealed by the player removing the SOC covering the player symbols. In the example embodiments discussed herein, the see-through SOC over the symbols (such as the words) on the board is not employed for brevity and simplicity. In various other embodiments, the symbols on the board can be also be covered with an SOC that the player has to remove to see the symbols on the board.

In various embodiments, the lottery ticket includes a plurality of shared symbols (such as shared letters) respectively in a first plurality of the spaces of the board, and a plurality of unshared symbols (such as unshared letters) respectively in a second plurality of the spaces of the board. Each of the shared symbols (such as shared letters) are shared by at least two adjacent symbol sets (such as two adjacent words) on the board, and the unshared symbols (such as unshared letters) are not shared by two adjacent symbol sets (such as words) on the board. Two adjacent symbol sets that have a shared symbol are considered to be connected by that shared symbol. Each symbol set on the board can thus be connected to zero, one, or more other symbol sets on the board.

The shared and unshared symbols and symbol sets can be positioned on the board in a variety of different manners in accordance with the present disclosure. For example, in various embodiments, the plurality of shared symbols (such as shared letters) and the plurality of unshared symbols (such as unshared letters) are positioned in the spaces of the board such that they form a plurality of the symbol sets wherein two or more of the symbol sets have one or more shared symbols. In various other embodiments, the plurality of shared symbols (such as shared letters) and the plurality of unshared symbols (such as unshared letters) are positioned in the spaces of the board such that they form a plurality of symbol sets wherein each of the symbol sets have one or more shared symbols. In various other embodiments, the plurality of shared symbols (such as shared letters) and the plurality of unshared symbols (such as unshared letters) are positioned in the spaces of the board such that they form a plurality of symbol sets wherein each of a plurality of symbol sets have at least two shared symbols. In various other embodiments, the plurality of shared symbols (such as shared letters) and the plurality of unshared symbols (such as unshared letters) are positioned in the spaces of the board such that they form a plurality of symbol sets wherein at least one of the symbol sets have one shared symbol and each of a plurality of symbol sets have at least two shared symbols. In various other embodiments, the plurality of shared symbols (such as shared letters) and the plurality of unshared symbols (such as unshared letters) are positioned in the spaces of the board such that they form a plurality of symbol sets wherein two or more or each of the plurality of symbol sets are connected by a shared symbol.

In various embodiments, the plurality of the shared and unshared symbols are positioned in a plurality of different symbol sets (such as different words) on the board. In various embodiments, each symbol set (such as each word) is either horizontally positioned in a row on the board or vertically positioned in a column on the board. It should be appreciated that the symbol sets can be otherwise suitably positioned on the board (such as diagonally) in accordance with the present disclosure.

In various embodiments, each of a plurality of the different symbol sets (such as multiple different words) have a shared first symbol (such as a shared first letter), a shared last symbol (such as a shared last letter), and if the symbol set has at least three symbols one or more unshared symbols (such as one or more unshared letters) between the shared first symbol (such as the shared first letter) and the shared last symbol (such as the shared last letter).

In various embodiments, the quantity of the spaces on the board (and thus quantity of the rows and columns) can vary in accordance with the present disclosure. The quantity of spaces, the quantity of symbol sets, the quantity of connected symbol sets, the quantity of shared symbols, the quantity of unshared symbols, and/or the arrangements of the symbol sets, the connected symbol sets, the shared symbols, and/or the unshared symbols can be predetermined, randomly determined, or otherwise suitably determined by the gaming system for each lottery ticket. It should further be appreciated that a plurality of the lottery tickets for a game provided by the lottery gaming system can have the same quantity of spaces but two or more of different quantities of symbol sets, connected symbol sets, shared symbols, unshared symbols, and/or arrangements of symbol sets, connected symbol sets, shared symbols, and/or unshared symbols.

In various embodiments, for each lottery ticket, the plurality of player symbols includes zero, one, and/or a plurality of the shared symbols and zero, one, and/or a plurality of the unshared symbols. In various embodiments, the plurality of player symbols includes one shared symbol and a plurality of different unshared symbols. In various embodiments, the plurality of player symbols includes a plurality of different shared symbol and a plurality of different unshared symbols. In various embodiments, the plurality of player symbols are randomly determined for each lottery ticket by the gaming system. In various embodiments, the plurality of player symbols are otherwise determined. In various embodiments, for each lottery ticket, the lottery ticket includes a plurality of different player symbols (such as different player letters). These player symbols can be predetermined, randomly determined, or otherwise suitably determined for each lottery ticket by the lottery gaming system. The quantity of these player symbols for each lottery ticket can vary or be the same for each lottery ticket of a lottery game in accordance with the present disclosure. The quantity of the player symbols on the lottery tickets can vary based on the wager on or purchase price for the lottery ticket in various embodiments. The quantity of the player symbols on the lottery tickets can vary based on one or more other or additional factors for the lottery ticket in various embodiments.

As mentioned above, in various embodiments, for each lottery ticket, the lottery ticket further includes: (a) a first non-see through covering (such as a scratch-off coating or SOC for physical lottery tickets) over the plurality of player symbols (such as the player letters) for the lottery ticket; and (b) a second see-through covering (such as a scratch-off coating or SOC for physical lottery tickets) over the plurality of symbols (such as letters) on the board as described above. In various different embodiments, the first and second coverings are separate.

In various embodiments, each lottery ticket provides multiple different possible ways for a player of the lottery ticket to potentially win awards (even though any particular lottery ticket can be associated with zero awards, only one award, a plurality of but less than a maximum quantity of potential awards, or the maximum quantity of potential awards).

The first way for the player to win one or more awards of a first type is via the revealing of the plurality of the player symbols (such as player letters) on the base and a determination of whether any combinations of the player symbols (such as player letters) form any complete symbol sets (such as complete words) on the board. For this first award determination, the player can win an award based on the quantity of completed symbol sets (such as the quantity of completed words) on the board formed by any combinations of the player symbols (such as the player letters). Different quantities of completed symbol sets (such as the different quantities of completed words) on the board can have different awards associated with such different quantities. In one example embodiment, each completed symbol set (such as each completed word) has an associated award. In another example embodiment, specific quantities of levels of quantities of completed symbol sets (such as completed words) have different associated awards. In various embodiments, the lottery ticket will have a paytable on the base or have a paytable otherwise associated with the lottery ticket that indicates the possible awards of this first type of award.

In various embodiments, the first type of awards for one or more of the completed symbol sets (such as completed words) can be based on a quantity of symbols of that completed symbol set (such as that completed word). For example, completed symbol sets (such as completed words) with a greater quantity of symbols (such as letters) can have higher awards associated with such completed symbol sets (such as completed words) than with a smaller quantity of symbols (such as letters).

In various embodiments, the first type of awards for one or more of the completed symbol sets (such as completed words) is independent of the quantity of symbols of that completed symbol set (such as that completed word). For example, each completed symbol sets (such as each completed words) can equally count toward determining any first type of award regardless of the quantity of symbols (such as letters) of that completed symbol set (such as that completed word).

In various embodiments, the first type of awards for one or more of the completed symbol sets (such as completed words) can be based on the probability of one or more symbols of that completed symbol set (such as that completed word) being a player symbol (such as a player letter). For example, completed symbol sets (such as completed words) with a greater quantity of lower probability symbols (such as lower probability letters) can have higher awards associated with such completed symbol sets (such as completed words) than with completed symbol sets (such as completed words) with a smaller quantity of lower probability symbols (such as lower probability letters). In these embodiments, the likelihood that a player obtains various different player symbols (such as different player letters) can be differently weighted.

The second way for the player to win one or more of a second type of award is via the revealing of the plurality of the player symbols (such as player letters) and a determination of whether any of the completed symbol sets (such as completed words) form any connected completed symbol sets (such as connected completed words) on the board. For this second award determination, the player can win a second type of award based on the quantity of connected completed symbol sets (such as the quantity of connected completed words) on the board. Different quantities of completed connected symbol sets (such as the different quantities of connected completed words) on the board can have different awards associated with such different quantities. In one example embodiment, each connected completed symbol set (such as each connected completed word) has an associated award. In another example embodiment, specific quantities or levels of quantities of connected completed symbol sets (such as connected completed words) have different associated awards. In various embodiments, the lottery ticket will have a paytable on the base or have a paytable otherwise associated with the lottery ticket that indicates the possible awards of this second type of award.

In various embodiments, the second type of awards for two or more of the connected completed symbol sets (such as connected completed words) can be based on a quantity of symbols of the connected completed symbol sets (such as the quantity of letters of the connected completed words). For example, greater quantities of symbols of the connected completed symbol sets (such as each connected completed words) can have higher awards associated with such connected completed symbol sets (such as connected completed words) than with a smaller quantity of symbols of the connected completed symbol sets (such as the connected completed words).

In various embodiments, the second type of awards for two or more of the connected completed symbol sets (such as connected completed words) can be independent of the quantity of symbols of the connected completed symbol sets (such as the quantity of letters of the connected completed words). For example, each connected completed symbol set (such as connected completed word) can equally count toward determining any second type of award regardless of the quantity of symbols (such as letters) of that connected completed symbol set (such as completed word).

In various embodiments, the second type of awards for one or more of the connected completed symbol sets (such as connected completed words) can be based on the probability of one or more of those connected completed symbol sets (such as the connected completed words) being completed by the player symbols (such as the player letters).

Figure 2:
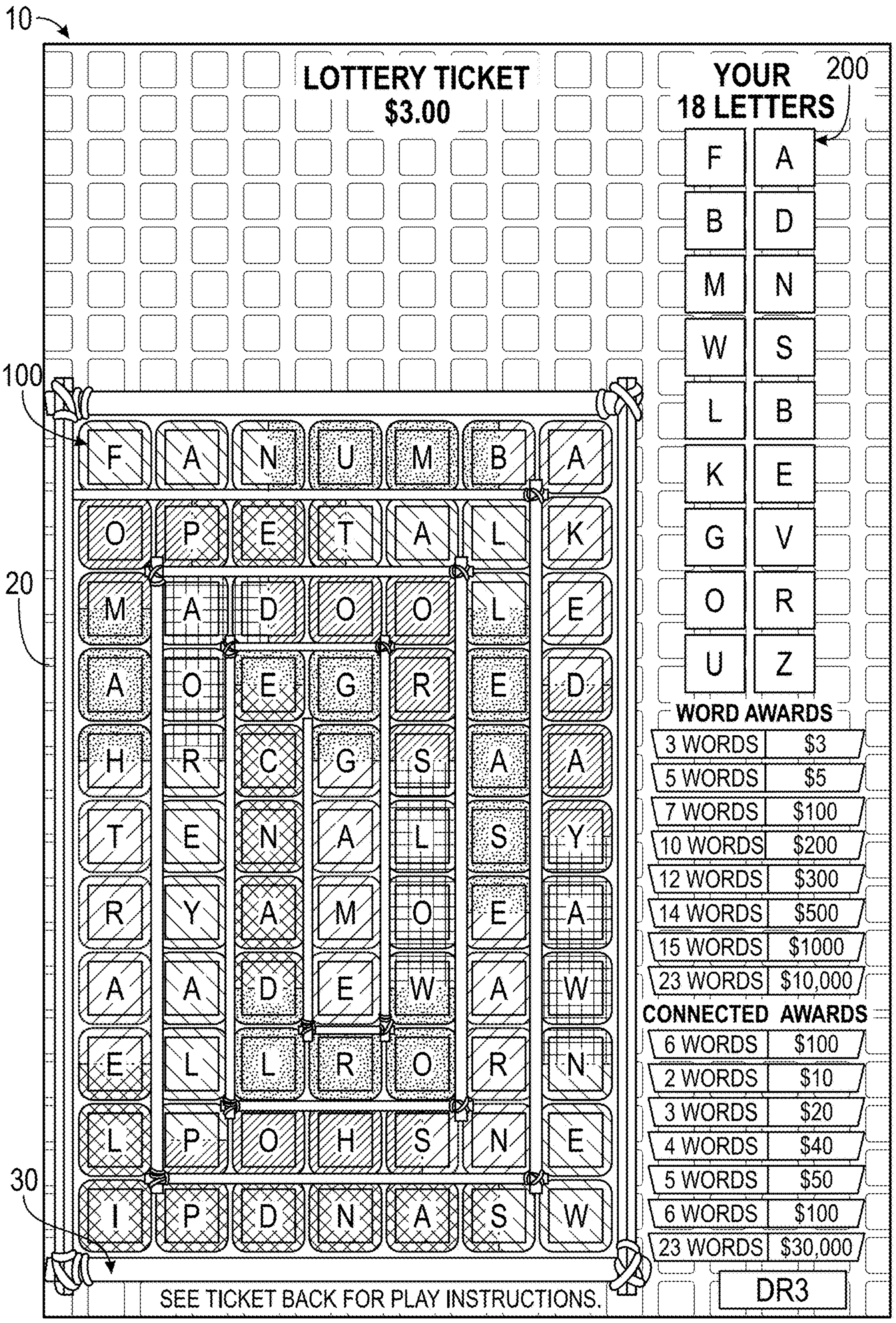

For purposes of further explaining an example embodiment of the present disclosure in conjunction with the example lottery ticket of FIGS. 1 and 2, the symbols of the lottery ticket are the letters A through Z that can form symbol sets in the form of words, the player symbols can be selected from the letters A though Z, and the shared and unshared letters can be any of the letters A through Z. It should be appreciated that such examples are not meant to limit the present disclosure.

FIGS. 1 and 2 illustrate an example lottery ticket 10 for a lottery game of one embodiment of the present disclosure that can be provided by a lottery gaming system of the present disclosure and purchased by a player. In this example embodiment, the lottery ticket 10 includes a base in the form of a substrate 20, a board 30 (having a plurality of spaces) formed (such as printed) on the substrate 20, a plurality of different letters 100 formed (such as printed) on the board 30, and a plurality of different player letters 200 (not individually labeled but shown in FIG. 2) formed (such as printed) on the substrate 20. The lottery ticket 10 further includes a scratch-off coating 290 (shown in FIG. 1 and indicated by the stars in this example) applied on the substrate 20 and initially covering the player letters 200 as shown in FIG. 1. FIG. 2 shows the lottery ticket 10 with the scratch-off coating 290 removed from the player letters 200.

This example lottery ticket 10 also includes a paytable for the first and second types of awards on (such as printed on) the base 20. In this example embodiment, the first type of awards are based on the quantity of completed words. In this example: (1) completion of 3 words results in an award of $3; (2) completion of 5 words results in an award of $5 (3) completion of 7 words results in an award of $100; (4) completion of 10 words results in an award of $200; (5) completion of 12 words results in an award of $300; (6) completion of 14 words results in an award of $500; (7) completion of 15 words results in an award of $1,000; and (8) completion of 23 words results in an award of $10,000. It should be appreciated that the quantities of completed words and associated awards and their respective amounts can vary in accordance with the present disclosure. In this example embodiment, the second type of awards are based on the quantity of connected completed words. In this example: (1) 2 connected completed words results in an award of $10; (2) 3 connected completed words results in an award of $20; (3) 4 connected completed words results in an award of $40; (4) 5 connected completed words results in an award of $50; (5) 6 connected completed words results in an award of $100; and (7) 23 connected completed words results in an award of $30,000. It should be appreciated that the quantities of connected completed words and associated awards and their respective amounts can vary in accordance with the present disclosure.

It should be appreciated that the award paytables can be positioned on the lottery tickets in any suitable manner. It should be appreciated that the award paytable for physical or virtual lottery tickets can be alternatively configured and positioned.

In this example, the plurality of different letters 100 on the board 30 include: (1) unshared letters that are bolded and underlined below; and (2) shared letters that are not bolded and not underlined below:

WORD 1: FAN
WORD 2: NUMB
WORD 3: BAKED
WORD 4: DAY
WORD 5: YAWN
WORD 6: NEWS
WORD 7: SANDPILE
WORD 8: EARTH
WORD 9: HAM
WORD 10: MOP
WORD 11: PET
WORD 12: TALL
WORD 13: LEASE
WORD 14: EARNS
WORD 15: SHOP
WORD 16: PLAYER
WORD 17: ROAD
WORD 18: DOORS
WORD 19: SLOW
WORD 20: WORLD
WORD 21: DANCE
WORD 22: EGG
WORD 23: GAME

In this example: (1) each of the words includes at least one unshared letter and at least one shared letter; (2) all of the words except for WORD 1 and WORD 23 include two shared letters (that are the first and last letters of each word); (3) all 23 words are connected and thus the maximum quantity of connected words are 23 in this example (although this quantity can vary in other examples); (4) each word is indicated by different shading patterns (that represent example different colors that can be used on the lottery ticket to distinguish the different words and that indicate the shared and unshared letters); and (5) each of the shared letters have both shading patterns of the adjacent connected words separated by a vertical dotted line.

In this example, the plurality of player letters 200 on the base 20 and thus the lottery ticket 10 are the following randomly selected 18 letters: F, A, B, D, M, N, W, S, L, B, K, E, G, V, O, R, U, and Z. In this example, various combinations of these 18 player letters 200 complete each of the following 14 words on the board:

WORD 1: FAN
WORD 2: NUMB
WORD 3: BAKED
WORD 4: DAY
WORD 5: YAWN
WORD 6: NEWS
WORD 13: LEASE
WORD 14: EARNS
WORD 17: ROAD
WORD 18: DOORS
WORD 19: SLOW
WORD 20: WORLD
WORD 22: EGG
WORD 23: GAME

In this example, there are thus 14 completed words based on the 18 player letters. In this example, these 14 completed words result in a first type of award of $500 for this example lottery ticket as indicated by the paytable on this lottery ticket 10.

In this example, the second type of award is determined based on the groups of connected completed words that are indicated by the paytable on this lottery ticket 10 and are as follows: (1) the 6 connected word award of $100 for the 6 connected completed words of WORD 1 to WORD 6; (2) the 2 connected word award of $10 for the 2 connected completed words of WORD 13 and WORD 14; (3) the 4 connected word award of $40 for the 4 connected completed words of WORD 17 to WORD 20; and (4) the 2 connected word award of $10 for the 2 connected completed words of WORD 22 and WORD 23.

It should be appreciated that in various embodiments, the lottery ticket can include and thus display additional information, such as a lottery ticket identification information (not shown) and/or any other relevant lottery ticket related information (not shown). It should also be appreciated that lottery ticket can be manufactured in various known manners or in new manners for producing physical or virtual lottery tickets. It should be appreciated that the shape, size, configuration, and quantity of spaces of the board can vary in accordance with the present disclosure. It should further be appreciated that the quantity of letters, player letters, words, shared letters, and unshared letters can vary in accordance with the present disclosure.

Figure 3:
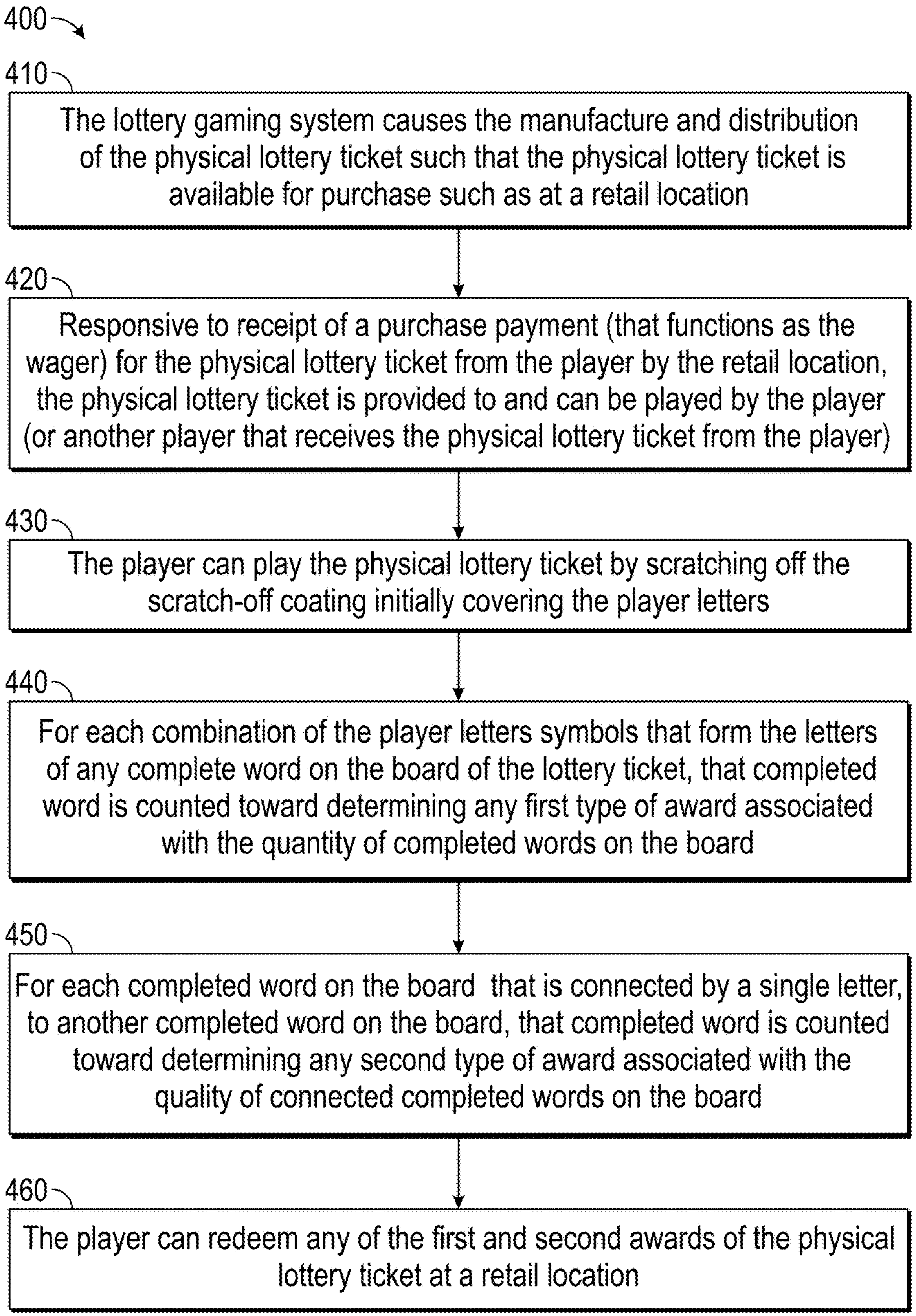
FIG. 3 is a flowchart of an example method of providing the example lottery ticket of FIG. 1 in accordance with one example embodiment of the present disclosure.

FIG. 3 is a flowchart of an example method 400 of providing an example lottery ticket of the present disclosure, where the lottery ticket is a physical lottery ticket. It should be appreciated that this method will vary if the lottery ticket is a virtual lottery ticket.

In the example method illustrated in FIG. 3, the lottery gaming system causes the manufacture and distribution of the physical lottery ticket such that the physical lottery ticket is available for purchase such as at a retail location, as indicated by block 410. The retail location can, for example, be a retail establishment that sells lottery tickets or can be an electronic lottery ticket provider such as lottery ticket kiosk, or otherwise as explained below.

Responsive to receipt of a purchase payment (that functions as the wager) for the physical lottery ticket from the player by the retail location, the physical lottery ticket is provided to and can be played by the player (or another player that receives the physical lottery ticket from the player), as indicated by block 420.

The player can play the physical lottery ticket by scratching off the scratch-off coating initially covering the player letters 200, as indicated by block 430. The player can do this in any suitable order for the player letters.

For each combination of the player letters that form the letters of any complete word on the board of the physical lottery ticket, that completed word is counted toward determining any first type of award associated with the quantity of completed words on the board, as indicated by block 440. This first type award is thus based on the quantity of completed words on the board of the lottery ticket.

For each completed word on the board that is connected by a shared letter to another completed word on the board of the physical lottery ticket, that connected completed word is counted toward determining any second type of award associated with the quantity of connected completed words on the board, as indicated by block 450. This second type award is thus for the quantity of connected completed words on the board of the lottery ticket.

In the example method illustrated in FIG. 3, the player can redeem any of the first and second awards for the physical lottery ticket at a retail location (such as the retail establishment or lottery ticket kiosk that sold the player the lottery ticket or another suitable retail location), as indicated by block 460.

Example Lottery Gaming Systems—General

In various embodiments of the present disclosure, the lottery gaming system and method are configured to be provided by a lottery agency (such as a state lottery agency). In various other embodiments of the present disclosure, the lottery gaming system and method are configured to be operated by a third party that runs the lottery for a lottery agency (such as a state lottery agency).

Figure 4:
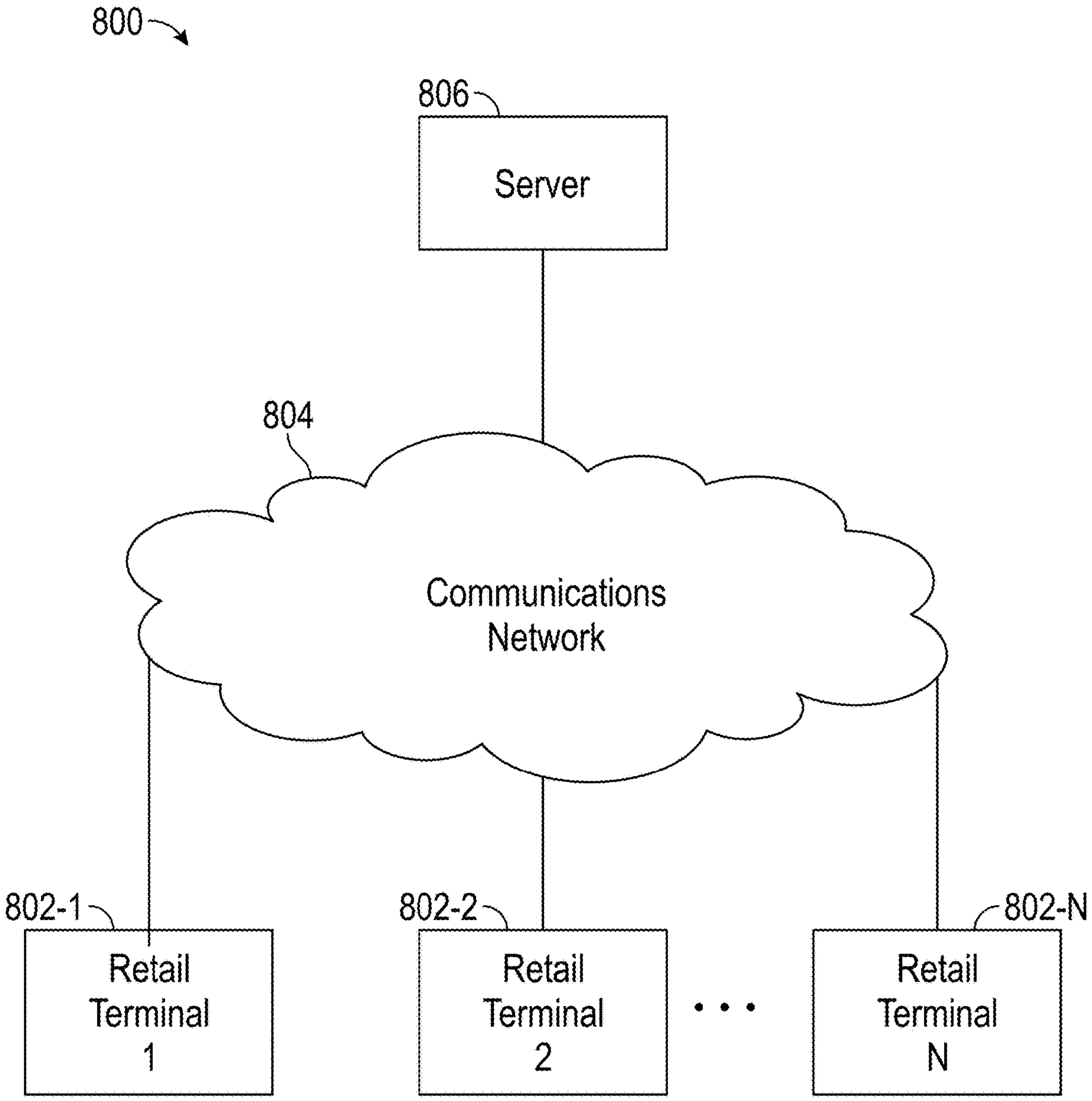
FIG. 4 shows an example lottery gaming system of one example embodiment of the present disclosure.

FIG. 4 illustrates an example networked lottery gaming system 800 for certain types of lottery ticket implementations. This example network lottery gaming system 800 generally includes: (1) a plurality of lottery retailer terminals 802-1 to 802-N; (2) a communications network 804; and (3) one or more lottery servers such as lottery server 806. Generally, the retailer terminals 802-1 to 802-N and the lottery server 806 are configured to perform certain functions described above and further described below.

In various embodiments of the lottery gaming systems and methods of the present disclosure, the player can purchase a respective physical or virtual lottery ticket via a suitable manner such as, but not limited to, one of the following: (1) a dedicated lottery kiosk (e.g., a lottery kiosk) configured to communicate over a data network (such as the Internet) to a lottery server (such as a lottery server 806 described below in connection with FIG. 4); (2) a retailer-operated lottery terminal configured to communicate over a data network (such as the Internet) to a lottery server (such as a lottery server 806 described below in connection with FIG. 4); (3) a personal computer configured to communicate over a data network (such as the Internet) to a lottery server (such as a lottery server 806 described below in connection with FIG. 4); and/or (4) a personal mobile device (such as a cellular telephone, tablet, or PDA) configured to communicate over a data network (such as a wireless or cellular data network) to a lottery server (such as a lottery server 806 described below in connection with FIG. 4).

In the example embodiment of FIG. 4, each retailer terminal 802 corresponds to (or is associated with) a particular lottery retailer. For example, the first retailer terminal 802-1 of FIG. 4 can be associated with a first lottery retailer, such as a convenience store, and the second retailer terminal 802-2 of FIG. 4 can be associated with a second lottery retailer, such as a supermarket. It should be understood that any suitable quantity of lottery retailer terminals can be employed in the lottery gaming system 800, along with any suitable quantity of corresponding lottery servers 806.

In various example embodiments, the lottery retailer terminal 802 includes one or more processor(s). Generally, the processor is operative to perform or process instructions, and in particular, to operate in accordance with the various methods described herein. For example, the processor of the lottery retailer terminal 802 can be operable to enable the lottery retailer terminal 802 to transmit data to (and receive data from) the lottery server 806. More specifically, for physical lottery tickets, the processor can enable the transmission of data representing: (a) a physical lottery ticket pack (including a plurality of lottery tickets) for validation of the physical lottery tickets in that lottery ticket pack; and/or (b) each physical lottery ticket upon a player redeeming that physical lottery ticket at such lottery retailer. For virtual lottery tickets, the processor can enable the transmission of data representing: (a) each virtual lottery ticket for the sale of that virtual lottery ticket; and/or (b) each virtual lottery ticket upon a player redeeming that virtual lottery ticket at such lottery retailer.

In various example embodiments, the lottery retailer terminal 802 includes one or more input device(s). The input devices of the lottery retailer terminal 802 can include components such as an optical scanner and/or a barcode scanner, for reading and/or for deriving information associated with a lottery ticket. For example, a lottery ticket can include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of one or more of the lottery retailer terminals 802 can include a clock. The clock can be employed to detect, derive and/or append time and/or date information for use by the lottery server 806 to: (i) create a data record corresponding to lottery tickets purchased or redeemed at the lottery retailer terminal 802, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, one or more of the lottery retailer terminals 802 includes one or more output device(s). Such output device(s) can include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, one or more of the lottery retailer terminals 802 also includes one or more communications port(s), such as a serial port, a modem or the like. Generally, the communications port of the lottery retailer terminal 802 can be operable to facilitate two-way data communications between (i) the lottery retailer terminal 802, and (ii) the lottery server 806. In accordance with some embodiments, the communications port of the lottery retailer terminal 802 can operate to facilitate the transmission of information between the lottery retailer terminal and a player device such as a personal digital assistant (PDA), cell phone and/or a dedicated (e.g., a proprietary) device.

In various example embodiments, one or more of the lottery retailer terminals 802 includes a data storage device such as a hard disk, optical or magnetic media, random access memory (RAM) and/or read-only memory (ROM), or the like memory device. Generally, the data storage device of the lottery retailer terminal 802 stores a software program, the software program enabling a processor of the retailer terminal 802 to perform various functions including some or all of the various steps described herein. For example, in accordance with certain embodiments, the lottery retailer terminal 802 can be configured to perform some or all of the functions of the lottery server 806 (and vice versa) such that the lottery server 806 and the lottery retailer terminal 802 can be considered as the same "device."

In various example embodiments, a lottery ticket sales device can be utilized in place of a lottery retailer terminal 802. Such a lottery ticket sales device can be implemented as a lottery server, a controller, a dedicated hardware circuit, an appropriately programmed general-purpose computer, or any other equivalent electronic, mechanical or electro-mechanical device. Thus, in various embodiments, a lottery ticket sales device can include, for example, but is not limited to: (1) a video lottery terminal that can include a touch sensitive screen for use by a player; (2) a personal computer (e.g., which communicates with a remote lottery server); or (3) a personal mobile device such as a mobile telephone, a tablet, or a personal digital assistant. The lottery ticket sales device can include any or all of the devices of the aforementioned systems.

In this example embodiment, the lottery server 806 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 806 includes one or more processor(s). Such a processor functions to process instructions, and in particular, to operate in accordance with various methods described herein. For example, the processor can operate to enable the lottery server 806 to transmit data to (and receive data from) the lottery retailer terminal 802. More specifically, the processor of the lottery server 806 can enable the transmission of data representing a lottery ticket, as well as information defining one or more payout(s) associated with that lottery ticket to or by a specific one of the lottery retailer terminals 802 shown in the lottery network 800 of FIG. 4. Thus, the lottery server 806 can be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 806 includes one or more input device(s). Examples of such input devices include a keypad, a mouse, a touch-screen, a random number generator, a microphone, and other digital or analog input devices.

In various example embodiments, the lottery server 806 also includes one or more output device(s). Example of output device(s) of the lottery server 806 include a monitor or other display for outputting information to an operator of the lottery server 806 (e.g., for displaying information such as statistical or sales data, win and loss information and/or payout amounts), a printer for producing a physical record (e.g., a report) of such data, and the like. In addition, the lottery server 806 can include one or more communications ports, such as a serial port, modem or the like, operable to facilitate two-way data communications between (i) the lottery server 806 and (ii) one or more lottery retailer terminals 802.

In various example embodiments, the lottery server 806 includes a data storage device (e.g., a hard disk or hard drive, a media-based (removable) memory, or the like). In certain embodiments, the data storage device of the lottery server 806 stores at least one software program, which includes a program to enable the processor of the lottery server 806 to perform some or all of the various steps and functions of at least one implementation of the methods described in detail herein. In addition, the data storage device of the lottery server 806 can operate to store one or more databases including a lottery ticket database and a lottery ticket redemption status database.

In various example embodiments, the lottery server 806 includes a lottery ticket server device that is located at a lottery ticket printing facility, and can also function to manage the ticket printing process. The lottery server 806 can also function to develop a lottery game matrix (e.g., determining base payouts, win frequencies, and the like) and to match static lottery content with secure paytable (or payout distribution) data. In certain embodiments, a lottery ticket printer device for use in such lottery gaming systems can utilize the game matrix information from the lottery server and can apply it to the secure paytable data.

In certain example embodiments, a retailer terminal (such as the first retailer terminal 802-1) of FIG. 4 is configured to perform some or all of the functions of the lottery server 806. Thus, in certain example embodiments, the lottery server 806 and the retailer terminal (such as the first retailer terminal 802-1) (or another given retailer terminal and server pairing) can be considered as the same "device."

Generally, the communications network 804 of FIG. 4 includes one or more local and/or wide-area network(s) proprietary and/or public network(s) (e.g., the Internet) for facilitating two-way data communications between the retailer terminals 802 and the lottery server 806. The lottery server 806 can communicate with lottery retailer terminals 802 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices can be in communication with the lottery server 806, and communication between the lottery retailer terminals 802 and the lottery server 806 can be direct or indirect. A variety of communications protocols can be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and can actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein can be practiced on a stand-alone gaming device and/or a gaming device in communication only with one or more other gaming devices. In such an embodiment, any functions described as performed by the computer can instead be performed by one or more gaming devices.

As used herein, a lottery retailer can include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A physical lottery ticket comprising:

a substrate;

a board on the substrate, the board comprising a plurality of borders that define a plurality of adjacent spaces on the board, the plurality of adjacent spaces arranged in a continuous pattern;

multiple variable words printed on the substrate in the plurality of adjacent spaces on the board defined by the borders, wherein a plurality of the words are different, wherein each of the words comprises a plurality of letters comprising one of a shared letter and an unshared letter, and wherein a plurality of pairs of the words are connected by the shared letter of that pair of words;

a plurality of different color-coded indicators on the substrate, each different color-coded indicator indicating the plurality of letters of a different one of the plurality of the words for a potential completion award associated with that word, wherein for each shared letter, two of the different color-coded indicators indicate that shared letter as a last letter of a first word of a pair of the words connected by that shared letter and a first letter of a second word of the pair of the words connected by that shared letter;

a removable covering formed on the substrate and covering the board; and a paytable printed on the substrate, the paytable indicating a first award associated with a first quantity of the words that are completed, and the paytable indicating a second award associated with a second quantity of the connected words that are completed, wherein the words and the paytable co-act to determine a value of the physical lottery ticket.

2. The physical lottery ticket of claim 1, wherein two of the words share a letter with two color-coded indicators.

3. The physical lottery ticket of claim 1, wherein each of a plurality of the words comprises a shared letter and an unshared letter.

4. The physical lottery ticket of claim 1, wherein each of a plurality of the words comprises two shared letters and an unshared letter.

5. The physical lottery ticket of claim 1, wherein for each of a plurality of the words, the two shared letters of that word are the first and last letters of that word.

6. The physical lottery ticket of claim 1, wherein the continuous pattern is a spiral pattern.

7. The physical lottery ticket of claim 1, wherein the plurality of adjacent spaces comprise a first space, a plurality of intermediate spaces, and a last space, wherein the first space is adjacent to only one of the plurality of intermediate spaces, the last space is adjacent to only one of the plurality of intermediate spaces, and each of the plurality of intermediate spaces is adjacent to only two other spaces.

8. The physical lottery ticket of claim 1, wherein the plurality of different color-coded indicators indicate, for each of the words, a beginning boundary and an end boundary of that word, wherein one of the beginning boundary and the end boundary of that word overlaps the other of the beginning boundary and the end boundary of an adjacent word.

9. The physical lottery ticket of claim 1, wherein each of the plurality of different color-coded indicators indicate, for a corresponding word of the words, a beginning boundary and an end boundary of that word, wherein for each shared letter, the end boundary of the first word of the pair of the words connected by that shared letter overlaps the beginning boundary of the second word of the pair of the words connected by that shared letter.

10. A physical lottery ticket comprising:

a substrate;

a board on the substrate, the board comprising a plurality of borders that define a plurality of adjacent spaces on the board, the plurality of adjacent spaces arranged in a continuous pattern;

multiple symbol sets printed on the substrate in the plurality of adjacent spaces on the board defined by the borders, wherein each of the symbol sets are different, wherein each of the symbol sets comprises a plurality of symbols comprising at least one shared symbol and at least one un-shared symbol, wherein each of a plurality of the symbol sets comprises two shared symbols, and wherein each adjacent pair of the symbol sets are connected by the shared symbol of that adjacent pair of symbol sets, and wherein the shared symbol of that adjacent pair of symbol sets is a last symbol of a first symbol set of the adjacent pair and a first symbol of a second symbol set of the adjacent pair;

a plurality of different shading indicators on the substrate, each different shading indicator indicating the plurality of symbols of a different one of the symbol sets for a potential completion award associated with that symbol set, wherein for each shared symbols, two of the different shading indicators indicate that shared symbol, an end boundary of the first symbol set of the adjacent pair connected by that shared symbol, and a beginning boundary of the second symbol set of the adjacent pair connected by that shared symbol;

a removable covering formed on the substrate and covering the board; and a paytable printed on the substrate, the paytable indicating a first award associated with a first quantity of the symbols set that are completed, and the paytable indicating a second award associated with a second quantity of the connected symbol sets that are completed, wherein the symbol sets and the paytable co-act to determine a value of the physical lottery ticket.

11. The physical lottery ticket of claim 10, wherein the symbol sets are words comprising letters.

12. The physical lottery ticket of claim 10, wherein each of the symbol sets comprises a shared symbol and an unshared symbol.

13. The physical lottery ticket of claim 10, wherein each of a plurality of the symbol sets comprises two shared symbols and an unshared symbol.

14. The physical lottery ticket of claim 10, wherein for each of a plurality of the symbol sets, the two shared symbols of that symbol set are the first and last symbols of that symbol set.

15. The physical lottery ticket of claim 10, wherein the continuous pattern is a spiral pattern.

16. A lottery gaming system comprising:

a processor; and a memory device that stores a plurality of instructions, that when executed by the processor, cause the processor to cause a physical lottery ticket to be created, the physical lottery ticket comprising:

a substrate;

a board on the substrate, the board comprising a plurality of borders that define a plurality of adjacent spaces on the board, the plurality of adjacent spaces arranged in a continuous pattern;

multiple symbol sets printed on the substrate in the plurality of adjacent spaces, wherein a plurality of the symbol sets are different, wherein each of the symbol sets comprises a plurality of symbols comprising a shared symbol and an un-shared symbol, and wherein a plurality of pairs of the symbol sets are each connected by the shared symbol of that pair of symbol sets;

a plurality of different color-coded indicators on the substrate, each different color-coded indicator indicating the plurality of symbols of a different one of the plurality of the symbol sets for a potential completion award associated with that symbol set, wherein for each shared symbol, two of the different color-coded indicators indicate that shared symbol as a last symbol of a first symbol set of a pair of the symbol sets connected by that shared symbol and a first symbol of a second symbol set of the pair of the symbol sets connected by that shared symbol;

a removable covering formed on the substrate and covering the board; and a paytable printed on the substrate, the paytable indicating a first award associated with a first quantity of the symbol sets that are completed, and the paytable indicating a second award associated with a second quantity of the connected symbol sets that are completed, wherein the symbol sets and the paytable co-act to determine a value of the physical lottery ticket.

17. The lottery gaming system of claim 16, wherein two of the symbol sets each comprise only one shared symbol.

18. The lottery gaming system of claim 16, wherein each of a plurality of the symbol sets comprises two shared symbols and an unshared symbol.

19. The lottery gaming system of claim 16, wherein for each of a plurality of the symbol sets, the two shared symbols of that symbol set are the first and last symbols of that symbol set.

20. The lottery gaming system of claim 16, wherein the continuous pattern is a spiral pattern.

* * * * *